Nov. 5, 1974   J. D. ANDREWS   3,846,262

ELECTROCHEMICAL MACHINING CUTOFF

Filed July 5, 1973

United States Patent Office 3,846,262
Patented Nov. 5, 1974

3,846,262
ELECTROCHEMICAL MACHINING CUTOFF
James D. Andrews, Birmingham, Mich., assignor to TRW Inc., Cleveland, Ohio
Filed July 5, 1973, Ser. No. 376,529
Int. Cl. B23p 1/02; C01b 13/04; C23b 5/76
U.S. Cl. 204—129.6
6 Claims

ABSTRACT OF THE DISCLOSURE

Method and apparatus for electrochemical cutting employing an improved electrode comprising a tube made of electrically conductive metal and a flattened cylindrical rod also of electrically conductive metal received within the tube and projecting therefrom, the rod having its flat surface providing a confined path for electrolyte between the flat surface and the inner wall of the tube.

BACKGROUND OF THE INVENTION

Field of the Invention

This invention is in the field of electrochemical machining and, more specifically, is directed to electrochemical cutting, particularly designed for cutting either very hard or very fragile metallic material. The invention is particularly concerned with an electrode structure which provides a confined path for an electrolyte stream, thereby controlling or channeling the electrolyte to provide a controlled, narrow cutting stream of electrolyte against the workpiece.

DESCRIPTION OF THE PRIOR ART

Electrochemical machining is a process of controlled metal removal in which the workpiece from which the metal is to be removed is made the anode in an electrolytic cell, and the electrode which delivers the electrolyte to the machining area is made the cathode. In essence, electrochemical machining involves passing current through an electrolyte in the gap between a workpiece and a suitably shaped tool. Under proper operating conditions, the shaped tool concentrates the electric current on those parts of the workpiece from which preferential removal of metal is required. The rate at which metal is removed from any part of the workpiece depends on the current density at that point and this, in turn, depends not only on the conductance of the electrolyte and the voltage applied across the electrodes but also upon the shape of the electrodes and their distance apart. In general, the current density will be greatest at the points of closest approach of tool and workpiece and as machining proceeds and the tool is fed toward the workpiece, the surface of the latter is dissolved away so that eventually the shape of the workpiece tends to become complementary to that of the tool.

There have been numerous patents on electrochemical machining, particularly hole drilling, starting with British Pat. No. 335,003 granted in 1930. There is little, however, in the literature or patents dealing with electrochemical cutting. One such disclosure appears in the book entitled "Electrochemical Machining" by De Barr and Oliver published by the American Elsevier Company of New York (1968). That volume refers to an electrochemical cutting operation employing a thin metal disk rotating at high speed as the cathode. An electrolyte is fed onto the surface of the disk and flows radially to the cutting zone during high speed rotation of the cathode.

SUMMARY OF THE INVENTION

The present invention provides an improved method and apparatus for electrochemical cutting making use of an improved electrode structure. The electrode consists of a relatively small diameter tube made of an electrically conductive metal such as titanium, titanium alloy, stainless steel or platinum. A flatted cylindrical rod is inserted within the tube, the rod having a radius of curvature on the order of about $\frac{1}{32}$ of an inch and being snugly received along the inner diameter of the tube. The rod is flatted along a chord which is less than the diameter of the rod so that the rod has a cross-sectional area greater than $\frac{1}{2}$ the cross-sectional area of the interior of the tube. The rod has a projecting portion which extends beyond the end of the tube by a distance at least equal to the thickness of the metal workpiece to be cut. The rod, in combination with the tube provides a confined path for channeling electrolyte between the flat surface and the inner wall of the tube, thereby providing a narrow stream of electrolyte which is directed at a workpiece along a cutting line. Relative movement between the workpiece and the electrode is employed to continue cutting along the cutting line.

BRIEF DESCRIPTION OF THE DRAWING

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, and in which.

DESCRIPTION OF THE PREFERRED EMBODIMENTS

Figure 1:
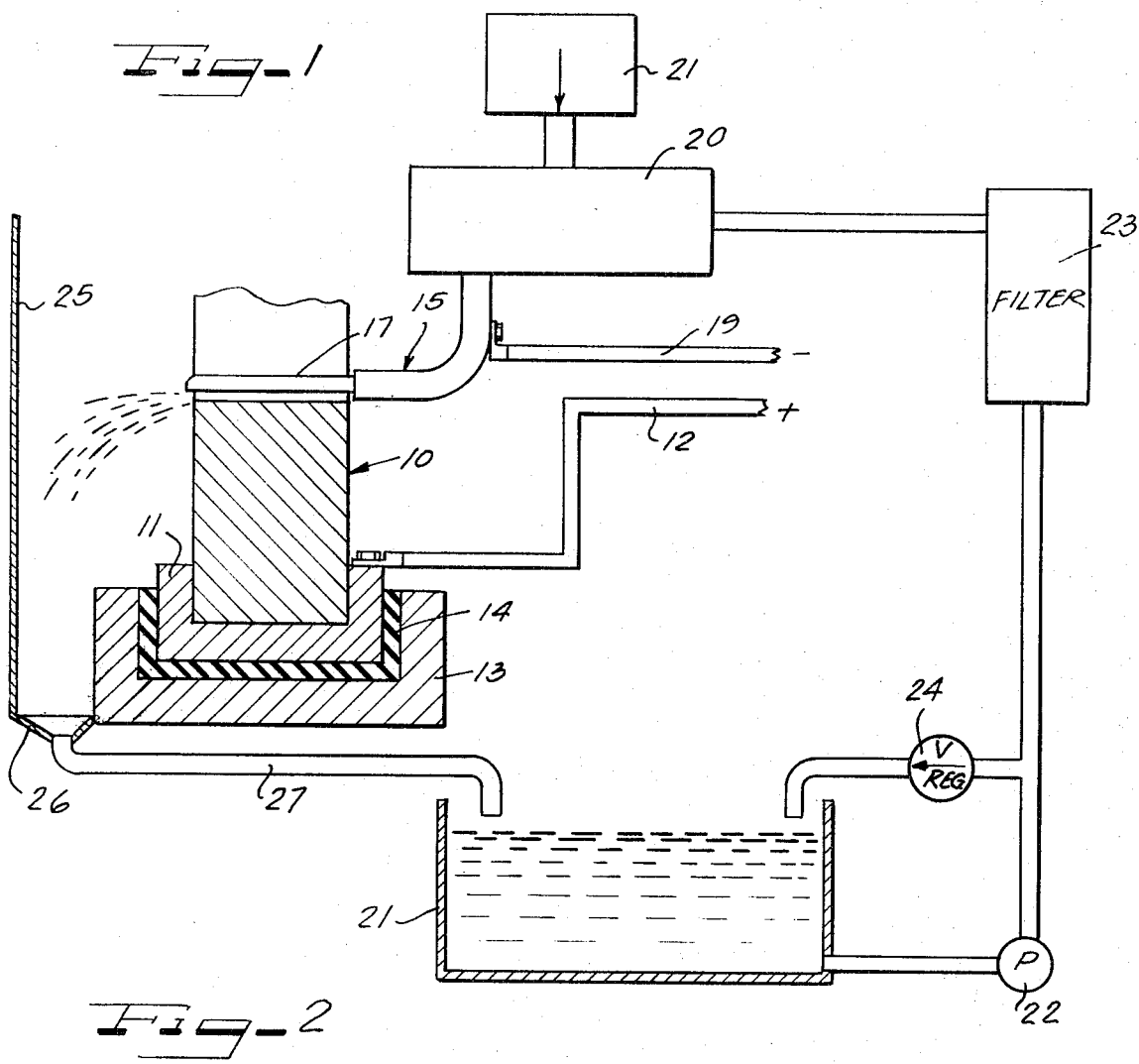
FIG. 1 is a somewhat schematic view of an electrochemical cutting apparatus employing the improved electrode of the present invention.

In FIG. 1, there is shown a workpiece 10 mounted in a fixture 11 which is connected to a positive source of electric potential by means of an electrical conductor 12. The fixture 11 is held within a suitable base 13 and separated from the base by means of a layer of electrical insulation 14.

Figure 2:
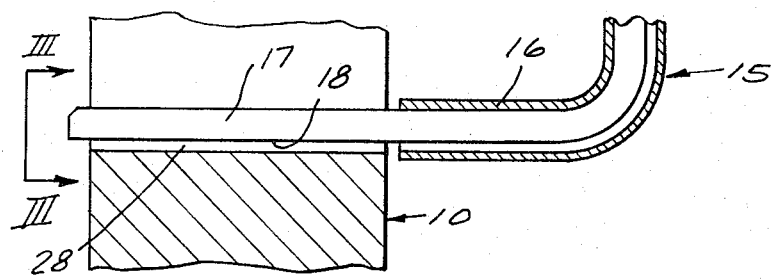
FIG. 2 is an enlarged fragmentary cross-sectional view of the electrode assembly during the cutting operation.
Figure 3:
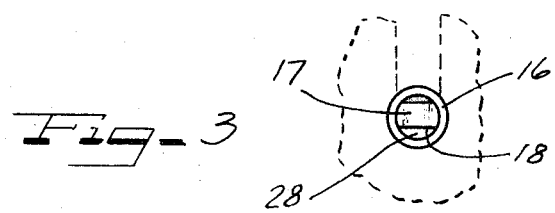
FIG. 3 is a view taken substantially along the line III—III of FIG. 2.

An electrochemical cutting electrode generally indicated at reference numeral 15 in the drawings includes a thin walled electrically conductive tube 16 composed of an electrically conductive metal such as titanium, titanium alloy, stainless steel or platinum, and a flatted rod 17 received securely therein and extending beyond the tube 16 by a distance which is at least equal to the thickness of the workpiece 10 being cut, as illustrated best in FIG. 2. The size of the electrode has been exaggerated in all of the figures of the drawings for purposes of clarity, as typically the tube 16 may have an inner diameter of about $\frac{1}{16}$ of an inch. As best seen in FIG. 3 the rod 17 has a flat surface 18 whose extent is less than the inner diameter of the tube 16 so that the flatted rod 17 occupies more than one-half of the cross-sectional area of the inner periphery of the tube, leaving an electrolyte passage 28 between the rod and the tube. With a tube of $\frac{1}{16}$ inch inner diameter, the radius of curvature of the rod 17 would be about $\frac{1}{32}$ inch. As shown in FIG. 1, the electrode 15 is connected to a source of negative potential by means of an electrical conductor 19.

The electrode 15 is held within a fixture 20 which is under the control of a tool feeding device generally illustrated at reference numeral 21 of the drawings. The nature of the feeding device is not germane to the present invention, as obviously the electrode can be operated by hand. The electrolyte is supplied to the electrode 15 through the fixture 20 from a tank 21. A pump 22 constantly withdraws electrolyte from the tank 21 and delivers it to a filter 23 before passage into the electrode 15 through the fixture 20. Any suitable electrolyte can be used for the purpose of the present invention, including materials such as sulfuric acid, dilute hydrochloric acid, a dilute solution of aqua regia and salt solutions. A portion of the pump output is continually recycled to the tank 21 by means of a flow regulator valve 24.

The spacing between the flat cutting surface 18 of the electrode 15, as well as the other parameters involved in the cutting operation will depend to a large extent upon the cutting rate, and the nature of the material. Typically, however, the gap between the flat surface 18 and the workpiece is about 0.002 to 0.005 inch. When using a 1/16 inch inner diameter tube, an electrolyte pressure of about 50 to 60 pounds per square inch will be employed at a feed rate of 0.10 inch per minute. A typical voltage between the electrode and the workpiece is 15 to 20 volts, at a current of 50 to 60 amperes when cutting 1/2 inch stock.

The assembly shown in FIG. 1 is also provided with a splash shield 25 and spent electrolyte running down the splash shield 25 is directed by means of a drain 26 into a conduit 27 for recirculation into the electrolyte tank 21.

The width of the cut provided by an assembly such as that shown in FIG. 1 is typically 10 to 15 thousandths of an inch larger than the width of the flat cutting surface 18. This amount of over-cut can be further reduced by applying a dielectric coating over the entire electrode except for the flattened cutting surface 18.

The improved electrode of the present invention has applicability to numerous types of cutting and trimming operations. For example, forged turbine blades frequently have a very thin flash along the leading or trailing edge resulting from the forging operation. Such flash is difficult to remove by conventional procedures such as grinding because the flash is so thin, the grinding wheel leaves heat checks on the edge being trimmed.

The method and apparatus of the present invention is also very suitable for trimming gates and sprues from castings produced by the investment casting process, since the superalloys used in such castings are frequently too tough to be cut by normal machining methods. It is also possible to employ the electrode of the present invention to cut shaped slots by using a suitably shaped electrode cutting edge.

It should be evident that various modifications can be made to the described embodiments without departing from the scope of the present invention.

I claim as my invention:

1. An electrode for electromechanical cutting comprising a tube made of electrically conductive metal, and a flatted cylindrical rod of electrically conductive metal fitted within said tube and projecting therefrom, at one end, the flattened portion of said rod projection constituting a cutting surface, said rod having its flat surface providing a path for electrolyte between said flat surface and the inner wall of said tube, the other end of said tube constituting means for introducing electrolyte to said path.

2. The electrode of claim 1 in which both said tube and said rod are composed of titanium.

3. The electrode of claim 1 in which said rod has a cross-sectional area greater than 1/2 of the cross-sectional area of the interior of said tube.

4. The electrode of claim 3 in which said rod has a radius of curvature on the order of 1/32 inch.

5. The method of electrochemical cutting which comprises directing an electrolyte under pressure into an electrode as defined in claim 1, directing the stream of electrolyte issuing from said electrode at a workpiece along a cutting line, and providing relative movement between said workpiece and said electrode to continue cutting along said cutting line.

6. The method of claim 5 in which said electrode is moved relative to said workpiece at a rate on the order of 0.1 inch per minute.

References Cited

UNITED STATES PATENTS

| | | | |
|---|---|---|---|
| 3,243,365 | 3/1966 | Aikin | 204—290 |
| 3,285,844 | 11/1966 | Hallsworth et al. | 204—284 |
| 3,336,213 | 8/1967 | Auger et al. | 204—224 |
| 3,383,302 | 5/1968 | Johnson | 204—224 |

FOREIGN PATENTS

| | | | |
|---|---|---|---|
| 335,003 | 9/1930 | Great Britain | 204—224 |

JOHN H. MACK, Primary Examiner

W. A. LANGEL, Assistant Examiner

U.S. Cl. X.R.

204—224